United States Patent Office 3,787,574
Patented Jan. 22, 1974

3,787,574
P-AMINOALKYLBENZENESULFONAMIDE DERIVATIVES FOR TREATING DIABETES MELLITUS
Henri Dietrich, Arlesheim, Basel-Land, and Claude Lehmann, Basel, Switzerland, assignors to Ciba-Geigy Corporation
No Drawing. Original application Sept. 11, 1970, Ser. No. 68,794, now Patent No. 3,712,899. Divided and this application Sept. 18, 1972, Ser. No. 290,041
Claims priority, application Switzerland, Sept. 4, 1969, 13,399/69
Int. Cl. A61k 27/00
U.S. Cl. 424—266    6 Claims

ABSTRACT OF THE DISCLOSURE

Compounds of the class of 1-[p-(carboxamidoalkyl)-phenylsulfonyl]-2-imino-imidazolidines and the pharmaceutically acceptable acid addition salts thereof have hypoglycemic activity; these compounds are active ingredients of pharmaceutical compositions and are useful for the treatment of diabetes mellitus; a typical embodiment is 1-[p-(2-(3-furancarboxamido)-ethyl)-phenylsulfonyl]-2-imino-3-cyclohexyl-imidazolidine.

CROSS-REFERENCE TO RELATED APPLICATION

This is a division of Ser. No. 68,794, filed Sept. 11, 1970, now U.S. Pat. No. 3,712,899.

The present invention relates to derivatives of 1-[p-(carboxamidoalkyl)-phenylsulfonyl]-2 - imino - imidazolidines, to pharmaceutical compositions containing these compounds and to the use thereof.

More particularly, the present invention relates to compounds of formula

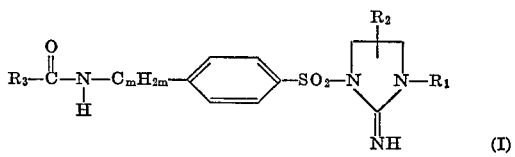

(I)

wherein $R_1$ is alkyl having at most six carbon atoms, cycloalkyl having from five to eight carbon atoms, phenyalkyl having at most nine carbon atoms or allyl;

$R_2$ is hydrogen, methyl or ethyl;

$R_3$ is a five to six membered mononuclear heterocycle with one or two heteroatoms, which is unsubstituted or substituted by lower alkyl or phenyl, and of which a methylene group can be replaced by a carbonyl group; and $m$ is the integer 2 or 3;

and the pharmaceutically acceptable acid addition salts thereof.

These compounds have been found to have a hypoglycemic effect in warm-blooded animals upon oral or parenteral administration. This activity, in combination with a favorable therapeutic index, characterizes the compounds of the present invention as being suitable for the treatment of diabetes mellitus.

The hypoglycemic action can be demonstrated in standard tests on experimental animals.

In the compounds of Formula I, $R_1$ as alkyl can be, e.g. the methyl, ethyl, propyl, isopropyl, butyl, sec.butyl, tert.butyl, isobutyl, pentyl, isopentyl, 2,2-dimethylpropyl, 1-methylbutyl, 1-ethylpropyl, 1,2-dimethylpropyl or a hexyl group, e.g. an n-hexyl, methylpentyl, dimethylbutyl or ethylbutyl group; as the cycloalkyl group, $R_1$ can be the cyclopentyl group, which can be optionally substituted by alkyl groups having 1–3 carbon atoms, the cyclohexyl group, which can be substituted by ethyl or methyl, and the cycloheptyl group optionally substituted by methyl, as well as the cyclooctyl group; as the phenylalkyl group, $R_1$ can the benzyl, the phenylethyl or the α-methylphenylethyl group.

The substituent $R_3$ embraces mononuclear heterocycles having 5–6 ring members, including 1–2 hetero atoms, whereby suitable hetero atoms are nitrogen, oxygen and sulfur. Accordingly, as a heterocycle having 5 ring members, $R_3$ can be, e.g. furan, tetrahydrofuran, thiophene, pyrrole, pyrazole, imidazole, oxazole, isoxazole, thiazole, thiazolidine and pyrrolidinone.

As a heterocyclic radical having 6 ring members, $R_3$ can be, e.g. pyridine, pyrimidine, pyrazine or pyridazine.

The above mentioned heterocycles can be substituted by lower alkyl groups and/or by phenyl groups. Further, a methylene group being present in one of these rings can be substituted by a carbonyl group.

Using the process according to the invention, compounds of Formula I are produced by reacting a compound of formula

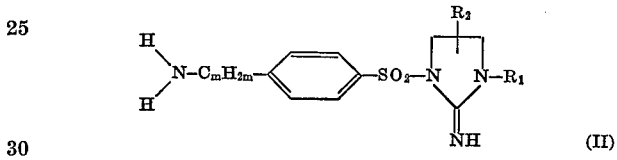

(II)

wherein $R_1$, $R_2$, and $m$ have the meaning given under Formula I, with a carboxylic acid of formula

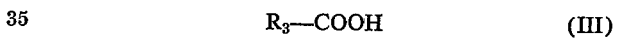

$R_3$—COOH    (III)

or with a reactive derivative of such a carboxylic acid, wherein $R_3$ has the meaning given under Formula I; and, optionally, converting the obtained reaction products into the salt of an inorganic or organic acid.

The reaction of a carboxylic acid of Formula III with an amine of Formula II, can be performed by firstly producing the corresponding carboxylic acid salt of the amine, and converting this, by subsequent heating, into the amide of Formula I. Preferably, an amine of Formula II is reacted with a carboxylic acid of Formula III in an inert solvent at temperatures of —5 to +5° C. in the presence of a water-splitting agent. As inert solvents, it is possible to use, e.g. hydrocarbons such as benzene, toluene or xylene, ethers such as diethyl ether, dioxane or tetrahydrofuran, chlorinated hydrocarbons such as methylene chloride, and lower ketones such as acetone or methyl ethyl ketone. A suitable water-splitting agent is, in particular, N,N'-dicyclohexylcarbodiimide. Furthermore, it is also possible to use carbonyldipyrazole.

Suitable reactive derivatives of a carboxylic acid of Formula III are, e.g. halides, lower alkyl esters, especially methyl or ethyl ester, phenyl ester, amides, lower mono- or dialkylamides, particularly N-methyl amides and N,N-dimethylamides, diphenylamides, also N-acylamides such as, e.g. acetylamides and benzoylamides.

The reaction of reactive derivatives of a carboxylic acid of Formula III with amines of Formula II is performed, e.g. at room temperature, or by heating in an inert organic solvent. Suitable as such are, e.g. the above already mentioned solvents. In general, the reaction can be carried out without the addition of condensation agents; such agents, e.g. alkali metal alcoholates and alkali metal hydroxides, may, however, optionally be added.

A halide of a carboxylic acid of Formula III is reacted according to the invention preferably in the presence of an acid-binding agent.

As acid-binding agents, inorganic bases or salts can be used such as, e.g. an alkali hydroxide, -acetate, -hydrogen carbonate, -carbonate and -phosphate, such as sodium hydroxide, -acetate, -hydrogen carbonate, -carbonate and -phosphate, or the corresponding potassium compounds. It is also possible to use calcium oxide, -carbonate, as well as -phosphate, and magnesium carbonate. Also, suitable, in place of inorganic bases or salts, are organic bases such as, e.g. pyridine, trimethylamine or triethylamine, diisopropylamine, or collidine. Added in excess, these may also be used as solvent.

Instead of amines of Formula II, it is also possible to use, for the reaction (according to the invention) with a carboxylic acid chloride, N-alkyl metal derivatives of these compounds such as, e.g. sodium, potassium or lithium derivatives.

The starting compounds of Formula II are, for their part, new compounds and may be produced, e.g. by reacting a reactive derivative of a sulphonic acid of formula

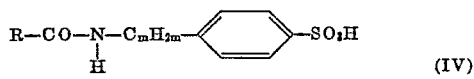

wherein

R represents an alkyl or aryl radical, e.g. a methyl or a phenyl group, and $m$ has the meaning given in Formula I, with 2-amino-2-imidazoline derivatives of formula

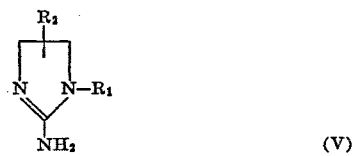

wherein $R_1$ and $R_2$ have the meaning given under Formula I;

and subsequently hydrolytically splitting off the protective acyl group (R—CO—). The N-acyl compounds derived from Formula II, obtained as intermediates, have likewise not been hitherto described in the literature.

Suitable reactive derivatives of a sulphonic acid of Formula IV are halides, especially chlorides and anhydrides of formula

wherein R and $m$ have the meaning given under Formulae IV and I. The anhydrides of Formula IVa can be obtained in a simple manner by the reaction of corresponding substituted sulphonic acid halides with salts of correspondingly substituted sulphonic acids.

Using a further process, starting materials of Formula II are obtained by reacting substituted p-(aminoalkyl)-benzenesulphonamides (produced analogously to the method of E. Miller, J. Amer. Chem. Soc. 62, 2101 (1940)) of formula

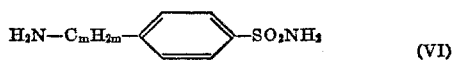

wherein $m$ has the meaning given under Formula I, with substituted N-(2-bromoalkyl)-cyanamides in alkaline medium.

The preparation of the starting compounds of Formula III is carried out using the generally known preparation methods for the corresponding carboxylic acid derivatives.

The new active substances of Formula I, or the pharmaceutically acceptable salts thereof, can be administered orally, rectally or parenterally. For salt formation, it is possible to use physiologically harmless inorganic or organic acids such as, e.g. hydrochloric acid, hydrobromic acid, sulphuric acid, phosphoric acid, methanesulphonic acid, acetic acid, lactic acid, succinic acid, tartaric acid and maleic acid; but also hypoglycemic sulfonyl ureas such as, e.g. p-toluenesulphonylbutyl urea, p-chlorobenzenesulphonylpropyl urea and p-[2-(2-methoxy-5-chlorobenzamido)-ethyl]-phenylsulfonyl-cyclohexyl urea.

For their intended use, the compounds of the invention are administered in amounts depending on the species, the age, weight and the particular condition of the individuals being treated, and the mode of administration. In general, the daily dosage varies between about 0.1 and 100 mg./kg. of body weight for warm blooded animals. Suitable dosage units such as dragées or tablets preferably contain 10-200 mg. of an active substance according to the invention, whereby the content of active substance is 20-80% by weight. The tablets and dragées are produced by combining the active substance, e.g. with solid pulverulent carriers such as lactose, saccharose, sorbitol or mannitol; starches such as potato starch, maize starch or amylopectin, also laminaria powder or citrus pulp powder, cellulose derivatives or gelatine, optionally with the addition of lubricants such as magnesium or calcuim stearate, or polyethylene glycols of suitable molecular weights. The tablets and dragée cores are coated, e.g. with concentrated sugar solutions which can also contain, e.g. gum arabic, talcum and/or titanium dioxide, or with a lacquer dissolved in readily volatile organic solvents or mixtures of solvents. Dyestuffs may be added to these coatings, e.g. for identification of the various dosage amounts.

Other suitable dosage units for oral administration are hard gelatine capsules, as well as soft closed capsules made from gelatine and a softener such as glycerin. The hard capsules contain the active substance preferably as a granulate, e.g. in admixture with fillers such as maize starch, and/or lubricants such as talcum or magnesium stearate, and optionally stabilizers such as sodium metabisulphite ($Na_2S_2O_5$) or ascorbic acid. In soft capsules, the active substance is preferably dissolved or suspended in suitable liquids such as liquid polyethylene glycols, whereby likewise stabilizers may be added.

The following prescriptions serve to further illustrate the production of tablets and dragées:

(a) 1000 g. of 1-[p-(2-(2-furancarboxamido)-ethyl)-phenylsulphonyl]-2-imino-3-cyclohexyl-imidazolidine are mixed with 500 g. of lactose and 270 g. of potato starch; the mixture is then moistened with an aqueous solution of 8.0 g. of gelatine, and granulated through a sieve. After drying of the granulate, 60.0 g. of potato starch, 60.0 g. of talcum, 10.0 g. of magnesium stearate and 20.0 g. of colloidal silicon dioxide are mixed in; the mixture is then pressed to form 10,000 tablets each weighing 200 mg. and each containing 100 mg. of active substance. Optionally, the tablets may be provided with grooves to facilitate a more precise adjustment of the dosage amount.

(b) A granulate is produced from 1000 g. of 1-[p-(2-nicotinamidoethyl)-phenylsulphonyl] - 2 - imino-3-cyclohexylimidazolidine, 345.0 g. of lactose and the aqueous solution of 6.0 g. of gelatine. After drying, the granulate is mixed with 10.0 g. of colloidal silicon dioxide, 40.0 g. of talcum, 40.0 g. of potato starch and 5.0 g. of magnesium stearate; the mixture is then pressed into 10,000 dragée cores. These are subsequently coated with a concentrated syrup made from 533.0 g. of crystallized saccharose, 20.0 g. of shellac, 75.0 g. of gum arabic, 250 g. of talcum, 20 g. of colloidal silicon dioxide and 1.5 g. of dyestuff; and then dried. The obtained dragées each weigh 240 mg. and each contain 100 mg. of active substance.

The following examples further illustrate the preparation of the new compounds of Formula I and of intermediate products not described hitherto; but these examples in no way constitute the only embodiments thereof. The temperatures are given in degrees centigrade.

EXAMPLE 1

An amount of 39.7 g. of 1-[p-(2-aminoethyl)-phenylsulfonyl]-2-imino - 3 - tert.butyl-imidazolidine dihydrochloride monohydrate, M.P. 232–234°, is dissolved in 200 ml. of water; and the base liberated with 150 ml. of 2-n. sodium hydroxide solution. It is extracted with methylene chloride. To the methylene chloride solution, dried with sodium sulfate, are added 15 g. of triethylamine. To this solution are thereupon added dropwise at room temperature, within 20 minutes, 15 g. of furan-2-carboxylic acid chloride in 100 ml. of methylene chloride. After the solution has been stirred for 1 hour at room temperature, it is washed with 100 ml. of water, then with 10 ml. of 2-n. sodium hydroxide solution, and afterwards a further twice with 100 ml. of water. The methylene chloride phase yields, after drying with sodium sulfate filtration, and concentration by evaporation, 1-[p-(2-(2 - furancarboxamido)-ethyl)-phenylsulfonyl]-2 - imino - 3 - tert.butylimidazolidine which, recrystallized from ethyl acetate, melts at 143–144°.

The following are obtained analogously to Example 1:

(a) from 42.3 g. of 1-[p-(2-aminoethyl)-phenynsulfonyl]-2-imino - 3 - cyclohexyl-imidazolidine dihydrochloride, M.P. 247–250°, and 15.0 g. of furan-2-carboxylic acid chloride is obtained: 1-[p-(2-(3-furancarboxamido)-ethyl) - phenylsulfonyl] - 2 - imino - 3 - cyclohexyl-imidazolidine which, recrystallized from ethyl acetate, melts at 143–144°;

(b) from 40.9 g. of 1-[p-(2-aminoethyl)-phenylsulfonyl]-2-imino - 3 - cyclopentyl-imidazolidine dihydrochloride (decomposition point 270°) and 16.5 g. of thiophene-2-carboxylic acid chloride is obtained: 1-[p-(2-(2-thiophenecarboxamido) - ethyl) - phenylsulfonyl]-2-imino-3-cyclopentyl-imidazolidine which, recrystallized from ethyl acetate/methanol, melts at 169–170°;

(c) from 42.3 g. of 1-[p-(2-aminoethyl)-phenylsulfonyl]-2-imino-3-cyclohexyl - imidazolidine dihydrochloride, M.P. 147–250°, and 16.5 g. of thiophene-2-carboxylic acid chloride is obtained: 1 - [p - (2 - (2 - thiophenecarboxamido) - ethyl) - phenylsulfonyl] - 2 - imino-3-cyclohexyl - imidazoline which, recrystallized from ethyl acetate, melts at 170–172°;

(d) from 38.3 g. of 1 - [p - (2-aminoethyl)-phenylsulfonyl]-2-imino - 3 - propyl - imidazolidine dihydrochloride, M.P. 255–256°, and 16.0 g. of nicotinic acid chloride is obtained: 1 - [p - (2 - nicotinamidoethyl)-phenylsulfonyl] - 2 - imino - 3 - propyl - imidazolidine which, recrystallized from ethyl acetate/methanol, melts at 163–164°;

(e) from 38.3 g. of 1 - [p - (2 - aminoethyl) - phenylsulfonyl] - 2 - imino - 3 - isopropyl - imidazolidine dihydrochloride, M.P. 249–250°, and 16.0 g. of nicotinic acid chloride is obtained: 1 - [p - (2 - nicotinamidoethyl-phenylsulfonyl] - 2 - imino - 3 - isopropyl-imidazolidine which, recrystallized from ethyl acetate/methanol, melts at 201–202°;

(f) from 39.7 g. of 1 - [p - (2 - aminoethyl)-phenylsulfonyl] - 2 - imino - 3 - isobutyl - imidazolidine dihydrochloride, M.P. 249–250°, and 16.0 g. of nicotinic acid chloride is obtained: 1 - [p - (2 - nicotinamidoethyl) - phenylsulfonyl] - 2 - imino - 3 - isobutyl-imidazolidine which, recrystallized from ethyl acetate, melts at 154–156°;

(g) from 39.7 g. of 1-[p - (2 - aminoethyl) - phenylsulfonyl] - 2 - imino - 3 - tert.butyl - imidazolidine dihydrochloride, M.P. 232–234°, and 16.0 g. of nicotinic acid chloride is obtained: 1 - [p - (2 - nicotinamidoethyl) - phenylsulfonyl] - 2 - imino - 3 - tert.butyl-imidazolidine which, recrystallized from ethyl acetate, melts at 191–194°;

(h) from 42.3 g. of 1 - [p - (2 - aminoethyl)-phenylsulfonyl] - 2 - imino - 3 - cyclohexyl - imidazolidine dihydrochloride, M.P. 247–250°, and 16.0 g. of nicotinic acid chloride is obtained: 1 - [p - (2 - nicotinamidoethyl) - phenylsulfonyl] - 2 - imino - 3 - cyclohexyl-imidazolidine which, recrystallized from ethyl acetate, melts at 170–171°;

(i) from 39.7 g. of 1 - [p - (2 - aminoethyl) - phenylsulfonyl] - 2 - imino - 3 - butyl - imidazolidine dihydrochloride, M.P. 259–260°, and 16.0 g. of isonicotinic acid chloride is obtained: 1 - [p - (2 - isonicotinecarboxamidoethyl) - phenylsulfonyl] - 2 - imino - 3 - butyl-imidazolidine which, recrystallized from ethyl acetate/methanol, melts at 163–165°;

(j) from 39.7 g. of 1 - [p - 2 - aminoethyl)-phenylsulfonyl] - 2 - imino - 3 - tert.butyl - imidazolidine dihydrochloride, M.P. 232–234°, and 16.0 g. of isonicotinic acid chloride is obtained: 1 - [p - (2 - isonicotinecarboxamidoethyl) - phenylsulfonyl] - 2-imino-3 - tert.butyl-imidazolidine which, recrystallized from ethyl acetate/methanol, melts at 170.5–171.5°;

(k) from 39.7 g. of 1 - [p - (2 - aminoethyl)-phenylsulfonyl] - 2 - imino - 3 - butyl - imidazolidine dihydrochloride, M.P. 259–260°, and 20.5 g. of 4-phenyl-3-isoxazole - carboxylic acid chloride is obtained: 1-[p-(2 - (4 - phenyl - 3 - isoxazolecarboxamido)-ethyl)-phenyl - sulfonyl] - 2 - imino - 3 - butyl - imidazolidine which, recrystallized from ethyl acetate/methylene chloride, melts at 129–130°.

The dihydrochlorides (used as starting materials) of 1-[p - (2 - aminoethyl) - phenylsulphonyl] - 2 - imino-imidazolidines varyingly substituted in the 3-position can be obtained, e.g. in a simple manner by reaction of p-(2-acylamidoethyl)-benzenesulphochloride with correspondingly substituted 2 - amino - imidazolines of Formula V, and subsequent hydrolytic cleavage of the acyl radical of the p-acylamidoethyl group with aqueous hydrochloric acid, as is described in the following for 1 - [p - (2-aminoethyl) - phenylsulphonyl] - 2 - imino - 3 - cyclohexyl-imidazolidine dihydrochloride:

(a) An amount of 40.8 g. of 1-cyclohexyl-2-aminoimidazoline hydrochloride is added to a solution of 17 g. of sodium hydroxide in 170 ml. of water. The obtained clear solution is mixed with a solution of 52.4 g. of p-(2-acetamidoethyl) - benzenesulphochloride in 200 ml. of acetone, whereby heating occurs. The mixture is heated for half an hour to 90°, and then concentrated in vacuo to dryness. The thus obtained crude 1-[p-(2-acetamidoethyl) - phenylsulphonyl] - 2 - imino - 3 - cyclohexyl-imidazolidine melts, after recrystallization from ethyl acetate, at 181–183°.

The applied sulphochloride can be produced as follows: To 35.0 g. of chlorosulphonic acid are added portion-wise, with stirring, 16.3 g. of N-phenethylacetamide. The obtained mixture is stirred for 3 hours at 60°, and then poured on to ice, whereby p-(2-acetamidoethyl)-benzene-sulphochloride precipitates in crystalline form. It is filtered off under suction, washed with water, dried in vacuo, and further processed as crude product.

(b) A solution of 39.2 g. of the 1-[p-(2-acetamidoethyl) - phenylsulphonyl] - 2 - imino - 3 - cyclohexyl-imidazolidine in 370 ml. of 2-n. hydrochloric acid is refluxed for 6 hours, and subsequently concentrated in vacuo to dryness. The crude oily 1-[p-2-aminoethyl)-phenyl-sulphonyl]-2-imino - 3 - cyclohexyl-imidazolidine dihydrochloride is taken up with warm ethanol. It crystallises in the cold state from the ethanolic solution and melts at 247–250°.

EXAMPLE 2

42.3 g. of 1 - [p - (2 - aminoethyl)-phenylsulfonyl]-2-imino-3-cyclohexyl-imidazolidine dihydrochloride, M.P. 247–250° are dissolved in 200 ml. of 2-n. sodium hydroxide the free base is extracted with methylene chloride, the extract is dried over sodium sulfate and the methylene chloride is distilled off in vacuo. The residue is then taken up with 300 ml. of dioxane and after addition of 16.0 g. of nicotinic acid methyl ester and 0.5 g. of sodium methylate the whole is refluxed for 4 hours. The solvent is distilled off in vacuo and the residue is taken up with hot acetic acid ethyl ester and the obtained solution is filtered while hot. After cooling to room temperature the 1-[p-(2-nicotinamidoethyl)-phenylsulfonyl] - 2 - imino-3-cyclohexyl-imidazolidine precipitates, M.P. 170–171°.

EXAMPLE 3

42.3 g. of 1 - [p - (2-aminoethyl)-phenylsulphonyl]-2-imino-3-cyclohexyl-imidazolidine dihydrochloride, M.P. 247–250° are dissolved in 200 ml. of water. After addition of 150 ml. of 2-n. sodium hydroxide the free base is taken up with methylene-chloride and the methylene-chloride solution is dried over sodium sulphate. Then 12.3 g. of nicotinic acid and 60 g. of N,N'-dicyclohexyl carbodiimide are added. The whole is kept for 1 hour at room temperature and evaporated to dryness in vacuo. The residue is shaken with a mixture of ethyl acetate and 2-n. hydrochloric acid. Then the whole is filtered to remove the N,N'-dicyclohexyl urea. The acid aqueous phase is separated. While cooling with ice concentrated sodium hydroxide solution is added and the free base is taken up with methylene chloride. The extract is dried over sodium sulphate and the solvent is distilled off in vacuo and the crude 1-[p-(2-nicotinamidoethyl)-phenylsulphonyl]-2-imino-3-cyclohexyl-imidazolidine obtained is recrystallized from ethyl acetate, M.P. 170–171°.

EXAMPLE 4

Analogously to Example 1 are obtained:

from 43.7 g. 1-[p-(2-amino-ethyl)-phenylsulphonyl]-2-imino-3-cyclopentyl - 4 - ethyl-imidazolidine-dihydrochloride and 17.0 g. thiophene-2-carboxylic acid chloride, 1 - [p-(2-(2-thiophene-carboxamido)-ethyl)-phenylsulphonyl] - 2 - imino - 3 - cyclopentyl-4-ethyl-imidazolidine, M.P. 144–145°;

from 43.7 g. 1-[p-(2-amino-ethyl)-phenylsulphonyl]-2-imino-3-cyclohexyl - 4 - methyl-imidazolidine-dihydrochloride and 16.0 g. nicotinic acid chloride, 1-[p-(2-nicotinamido - ethyl) - phenylsulphonyl] - 2 - imino-3-cyclohexyl-4-methyl-imidazolidine;

from 43.1 g. 1-[p-(2-amino-ethyl)-phenylsulphonyl]-2-imino-3-benzyl-imidazolidine-dihydrochloride and 16.0 g. nicotinic acid chloride, 1-[p-(2-nicotinamido-ethyl)-phenylsulphonyl]-2-imino-3-benzyl-imidazolidine, M.P. 173–175°;

from 44.5 g. 1-[p-(2-amino-ethyl)-phenylsulphonyl]-2-imino-3-(2-phenyl-ethyl) - imidazolidine - dihydrochloride and 15.0 g. furan-2-carboxylic acid chloride, 1-[p-(2 - (2-furancarboxamido)-ethyl)-phenylsulphonyl]-2-imino - 3 - (2-phenyl-ethyl)-imidazolidine, M.P. 182–183°;

from 42.5 g. 1-[p-(2-amino-ethyl)-phenylsulphonyl]-2-imino - 3 - (1,2-dimethyl-butyl)-imidazolidine-dihydrochloride and 18.0 g. 5-methyl-thiophene-2-carboxylic acid chloride, 1-[p-(2-(5-methyl - 2 - thiophenecarboxamido)-ethyl)-phenylsulphonyl]-2-imino - 3 - (1,2-dimethyl-butyl)-imidazolidine;

from 43.7 g. 1-[p-(2-amino-ethyl)-phenylsulphonyl]-2-imino - 3 - cycloheptyl-imidazolidine-dihydrochloride and 18.0 g. 5-methyl-thiophene-2-carboxylic acid chloride, 1-[p - (2 - (5-methyl-2-thiophenecarboxamido)-ethyl)-phenylsulphonyl] - 2 - imino - 3 - cycloheptyl-imidazolidine;

from 38.1 g. 1-[p-(2-amino-ethyl)-phenylsulphonyl]-2-imino - 3 - allyl-imidazolidine-dihydrochloride and 15.0 g. furan-2-carboxylic acid chloride, 1-[p-(2-(2-furancarboxamido)-ethyl)-phenylsulphonyl] - 2 - imino-3-allyl-imidazolidine, M.P. 134–135°;

from 35.5 g. 1-[p-(2-amino-ethyl)-phenylsulphonyl-2-imino - 3 - methyl-imidazolidine-dihydrochloride and 15.0 g. furan-2-carboxylic acid chloride, 1-[p-(2-(2-furancarboxamido) - ethyl) - phenylsulphonyl] - 2-imino-3-methyl-imidazolidine, M.P. 210.5–211.5°;

from 42.3 g. 1-[p-(2-amino-ethyl)-phenylsulphonyl]-2-imino-3-cyclohexyl-imidazolidine - dihydrochloride and 17.0 g. 4-methyl-thiazole-5-carboxylic acid chloride, 1-[p-(2-(4-methyl-5-thiazolecarboxamido) - ethyl)-phenylsulphonyl] - 2 - imino - 3 - cyclohexyl-imidazolidine-monohydrate, M.P. 164–165°;

from 42.3 g. 1-[p-(2-amino-ethyl)-phenylsulphonyl]-2-imino-3-cyclohexyl - imidazolidine-dihydrochloride and 17.0 g. pyrrolidin-5-one - 2 - carboxylic acid chloride, 1-[p-(2-(2-pyrrolidin - 5 - one-carboxamido)-ethyl)-phenylsulphonyl] - 2 - imino - 3 - cyclohexylimidazolidine, M.P. 165°;

from 42.3 g. 1-[p-(2-amino-ethyl)-phenylsulphonyl]-2-imino - 3 - cyclohexyl - imidazolidine - dihydrochloride and 16.0 g. pyridine-2-carboxylic acid chloride, 1-[p-(2-(2-pyridine-carboxamido) - ethyl - phenylsulphonyl]-2-imino-3-cyclohexyl-imidazolidine, M.P. 167–168°;

from 43.7 g. 1-[p-(2-amino-ethyl)-phenylsulphonyl]-2-imino - 3 - cyclopentyl - 4 - ethyl-imidazolidine dihydrochloride and 15.0 g. furan-2-carboxylic acid chloride, 1 - [p - (2 - (2 - furancarboxamido)-ethyl)-phenylsulphonyl] - 2 - imino - 3 - cyclopentyl - 4 - ethyl-imidazolidine, M.P. 105–106°;

from 43.7 g. 1-[p - amino - ethyl)-phenylsulphonyl]-2-imino-3-cyclohexyl - 4 - methyl - imidazolidine-dihydrochloride and 15.0 g. furan-2-carboxylic acid chloride, 1-[p - (2 - (2-furancarboxamido)-ethyl)-phenylsulphonyl] - 2 - imino - 3 - cyclohexyl - 4 - methyl-imidazolidine, M.P. 136–137°;

from 44.5 g. 1-[p-(2-amino-ethyl)-phenylsulphonyl]-2-imino - 3 - (2 - phenyl-ethyl)-imidazolidine-dihydrochloride and 15.0 g. furan-2-carboxylic acid chloride, 1[p - (2 - (2-furancarboxamido)-ethyl)-phenylsulphonyl] - 2 - imino - 3 - (2 - phenyl-ethyl)imidazolidine, M.P. 182–183°;

from 43.1 g. 1-[p-(2-amino-ethyl)-phenylsulphonyl]-2-imino-3-benzyl-imidazolidine-dihydrochloride and 16.0 g. nicotinic acid chloride, 1-[p-(2-nicotinamido-ethyl)-phenylsulphonyl] - 2 - imino - 3 - benzyl-imidazolidine, M.P. 173–175°; and from 45.1 g. 1-[p-(2-amino-ethyl)-phenylsulphonyl]-2-imino - 3 - cyclohexyl - 4 - ethyl-imidazolidine-dihydrochloride and 18.0 g. thiophene-2-carboxylic acid chloride, 1 - [p-(2-(2-thiophene-carboxamido)-ethyl)-phenylsulphonyl]-2-imino - 3 - cyclohexyl - 4 ethyl-imidazolidine, M.P. 144–145°.

What is claimed is:

1. A pharmaceutical composition comprising a hypoglycemically effective amount of a compound of the formula

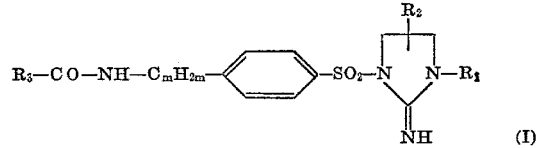

wherein $R_1$ is alkyl of at most six carbon atoms, cycloalkyl or alkyl substituted cycloalkyl of, in all, from five to eight carbon atoms, phenylalkyl of at most three carbon atoms in the alkyl chain, or allyl;

$R_2$ is hydrogen, methyl or ethyl;

$R_3$ is furan, thiophene or pyridine, which is unsubstituted or substituted by lower alkyl;

$m$ is the integer 2 or 3;

or the pharmaceutically acceptable acid addition salts thereof, and a pharmaceutical carrier therefor.

2. A method of treating diabetes mellitus in a warm-blooded animal comprising orally or parenteral administering to said animal a hypoglycemically effective amount of a compound according to claim 1.

3. The composition of claim 1, wherein the compound is 1 - [p - (2 - (3 - furancarboxamido)-ethyl)-phenylsulfonyl]-2-imino-3-cyclohexyl-imidazolidine.

4. The composition of claim 1, wherein the compound is 1 - [p - (2 - (2 - thiophenecarboxamido)-ethyl)-phenylsulfonyl]-2-imino-3-cyclopentyl-imidazolidine.

5. The composition of claim 1, wherein the compound is 1 - [p - (2 - (2 - thiophenecarboxamido)-ethyl)-phenylsulfonyl]-2-imino-3-cyclohexyl-imidazolidine.

6. The composition of claim 1, wherein the compound is 1 - [p - (2-nicotinamidoethyl)-phenylsulfonyl]-2-imino-3-cyclohexyl-imidazolidine.

References Cited
UNITED STATES PATENTS
3,694,551   9/1972   Dietrich _____ 424—273

ALBERT T. MEYERS, Primary Examiner
F. E. WADDELL, Assistant Examiner

U.S. Cl. X.R.
424—250, 251, 270, 272, 273